H. H. NICHOLSON.
CABLE SUPPORT FOR TERMINAL OR JUNCTION BOXES.
APPLICATION FILED MAR. 26, 1909.
948,674.
Patented Feb. 8, 1910.
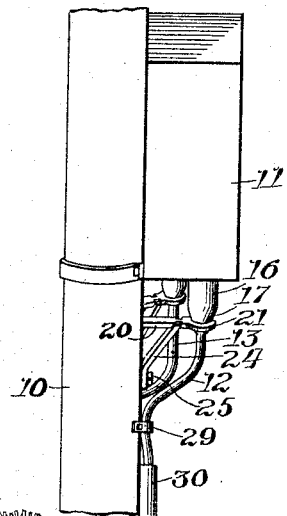
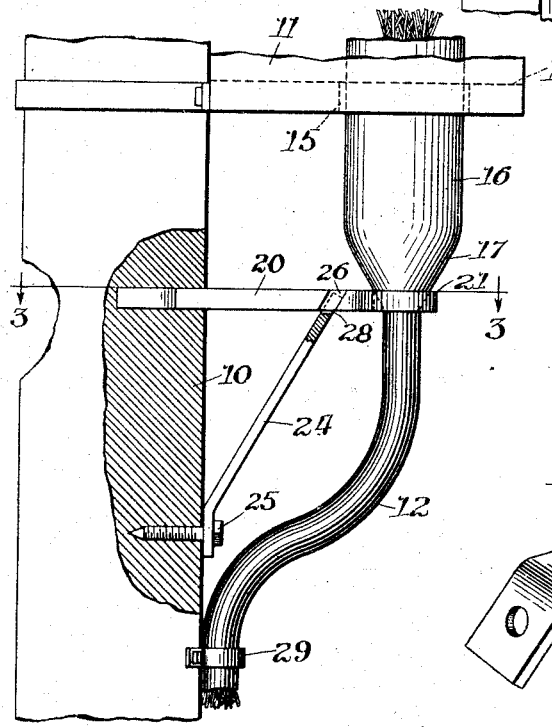
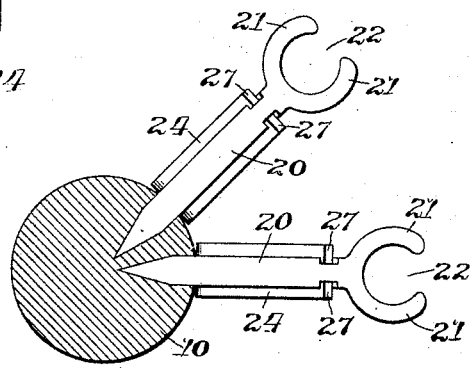
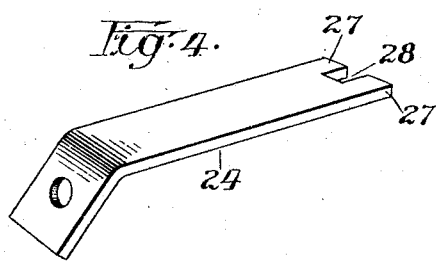
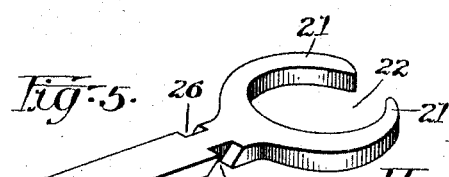
Witnesses:
Inventor:
Harry H. Nicholson
by Porter Brown
Attys.

UNITED STATES PATENT OFFICE.

HARRY H. NICHOLSON, OF EVANSTON, ILLINOIS.

CABLE-SUPPORT FOR TERMINAL OR JUNCTION BOXES.

948,674.  Specification of Letters Patent.  Patented Feb. 8, 1910.

Application filed March 26, 1909. Serial No. 485,873.

*To all whom it may concern:*

Be it known that I, HARRY H. NICHOLSON, a citizen of the United States, and a resident of Evanston, in the county of Cook and State of Illinois, have invented certain new and useful Improvements in Cable-Supports for Terminal or Junction Boxes; and I do hereby declare that the following is a full, clear, and exact description thereof, reference being had to the accompanying drawings, and to the numerals of reference marked thereon, which form a part of this specification.

This invention relates to novel cable supporting devices for use in connection with the terminal or junction boxes of telephone and telegraph systems designed to support the ends of the ground and aerial cables at the terminal or junction box, and the invention consists in the matters hereinafter set forth and more particularly pointed out in the appended claim.

The object of the invention is to provide an exceedingly simple and effective supporting device for the ends of wire cables and the pot-heads thereon, which is adapted to be quickly and readily attached to the pole or other support, with which the cable and pot-head may be readily engaged and from which they may be easily disengaged, and which acts to hold the cable and pot-head firmly in position, so as to avoid liability of displacement of the cable and pot-head, in such manner as to endanger their connections with the terminal connections inside of the junction box.

In the drawings: Figure 1 is a side elevation of a portion of a telephone pole and a terminal or junction box thereon, showing a cable supporting device embodying my invention. Fig. 2 is an enlarged side elevation of the pole and one of the cable supporting devices. Fig. 3 is a transverse section on the line 3—3 of Fig. 2. Figs. 4 and 5 are perspective views of the parts of supporting device.

As shown in the drawings, 10 designates a pole for supporting telephone or telegraph wires, and 11 designates a terminal or junction box which is supported in any suitable manner on said pole, usually just below the wire supporting cross-arms.

12 designates the upper end of a ground cable that is carried upwardly from a conduit in the ground along the pole to the terminal or junction box, and 13 designates a cable that leads from the said box and carries the aerial wires.

16, 16 designate open topped pot-heads which constitute enlargements of the cable sheaths or envelops and which contain bundles of loose wires at the ends of the cables 12 and 13 from which the cable sheath or envelop has been stripped. Both of the pot-heads 16 extend at their upper ends into the box through the bottom wall 14 thereof, said wall having an opening 15 to receive each pot-head. These pot-heads 16 are made separate from the sheath of the cable and of considerably greater diameter than said sheath so as to contain the bundle of unconfined wires at the end of the cable, said wires thus being rendered severally convenient of access to permit of their connection with the terminal connecting wires within the terminal or junction box. The lower end of each pot-head is tapered downwardly and is provided at its tapered lower end 17 with an axial opening through which the cable extends. The pot-head is applied to the cable in the usual manner, being slipped over the end of the cable before the sheath or covering is stripped from the ends of the wires to be exposed and before the wires are loosened or freed. After the end of the cable sheath has been removed to free the ends of the wires, the hollow head or receptacle is drawn up over the unconfined bundle of wires, and the lower tapered end of the head is then soldered or otherwise attached to the cable sheath. The pot-head then forms in effect a part of the cable.

My invention relates to means for attaching the pot-heads thus formed to the poles or other supports in such manner that said pot-heads and the cables are firmly fixed in position, thus avoiding liability of displacement of the cables and pot-heads in a way to impair the connections of the cable wires with the terminals inside the terminal or junction box.

My improved supporting device comprises a two-part bracket consisting of a shank member 20 and a detachable brace member 24. Each shank member is sharpened at its inner end, so that it may be driven horizontally into the pole 10, and is provided at its outer end with curved arms 21, 21 so as to form an eye 22 to receive and engage the lower or tapered end of the pot-head 16; said arms being separated at their outer or free ends to form an opening through which the part of the cable below the pot-head may be inserted laterally into said eye. Each brace member consists of a flat strap provided at its lower end with means for rigidly securing it to the pole 10, as by means of a screw-bolt 25. The brace member is detachably interlocked at its upper end with the shank member just in rear of the eye. As herein shown, the shank member is provided in rear of the eye portion 22, and on opposite sides thereof, with downwardly and rearwardly inclined notches 26, 26 and the upper end of the brace member 24 is provided with arms 27, 27, separated by a notch 28; the arms being adapted to extend upwardly through the notches 26 of the shank members, and the reduced portion of the shank member resting in the notched upper end of the brace member. The ground conduit 12 is carried downwardly alongside the pole 10, and may be attached thereto by a cable clip 29 at a point near the box, and may be inclosed below the clip in a suitable casing 30 which is attached to the pole. The supporting bracket thus formed is attached to the pole by driving the shank member into the pole and then applying the brace member and securing its lower end to the pole. The bracket as a whole is located a distance below the bottom wall 14 of the terminal or junction box, with the open eye 22 axially in line with the opening 15 in said bottom wall. The opening 15 in said bottom wall is made sufficiently larger than the pot-head to permit the head to be inserted upwardly through the said opening when the head is disposed at a slight angle to the axis of the opening. When the lower end of the pot-head is brought into such position that the part of the cable below the same may be slipped laterally into the open eye, the head is brought to a vertical position and allowed to rest with its tapered lower end on the upper faces of the arms 21 around the open eye. In this position of the parts the pot-head 16 and the cable extending therefrom will be held firmly in relatively fixed relation to the bottom wall of the box, the engagement of the lower, tapered end of the pot-head with the eye of the bracket being to hold the pot-head and upper end of the cable firmly from lateral movement.

The connection of the supporting bracket to the pole is a firm and rigid one, while at the same time the parts thereof may be readily attached to the pole. Moreover, the construction of the bracket and its relation to the opening in the bottom wall of the box is such as permits ready attachment of the pot-head to and its detachment from the supporting bracket and box.

It will be evident that the device herein shown and described may be slightly altered in its structural details without departing from the spirit of the invention, and the invention is not limited to such details except as hereinafter made the subject of specific claims. It will be understood that the supporting device described may be used to support the pot-head of either a ground or aerial cable at a box where connection is made from either an underground cable or aerial cable to an aerial cable which is led away from the box.

I claim as my invention:—

The combination with a cable provided with a pot-head tapered at its lower end, of a supporting device for the pot-head comprising a shank member pointed at its inner end to be driven into a pole or support and provided at its outer end with an eye which is smaller in diameter than the pot-head and having an opening adapted for the passage of the cable laterally into the eye, and a brace member adapted to be detachably interlocked at its upper end with the outer end of the shank member, inside of the eye thereof, and provided at its lower end with means for securing its said lower end rigidly to the said pole or support.

In testimony that I claim the foregoing as my invention I affix my signature in the presence of two witnesses, this 16th day of March A. D. 1909.

HARRY H. NICHOLSON.

Witnesses:
W. L. HALL,
G. R. WILKINS.